(12) United States Patent  
Miyazaki

(10) Patent No.: US 8,993,664 B2
(45) Date of Patent: Mar. 31, 2015

(54) RUBBER COMPOSITION FOR TIRES AND PNEUMATIC TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/232,791

(22) PCT Filed: Apr. 24, 2012

(86) PCT No.: PCT/JP2012/060898
§ 371 (c)(1),
(2), (4) Date: Jan. 14, 2014

(87) PCT Pub. No.: WO2013/021694
PCT Pub. Date: Feb. 14, 2013

(65) Prior Publication Data
US 2014/0155521 A1 Jun. 5, 2014

(30) Foreign Application Priority Data

Aug. 9, 2011 (JP) ................................. 2011-174099
Apr. 11, 2012 (JP) ................................. 2012-090339

(51) Int. Cl.
*B60C 1/00* (2006.01)
*C08L 9/06* (2006.01)
*C08K 3/04* (2006.01)
*C08L 45/02* (2006.01)
*C08K 3/36* (2006.01)
*C08L 21/00* (2006.01)

(52) U.S. Cl.
CPC ... *C08L 9/06* (2013.01); *C08K 3/04* (2013.01); *C08L 45/02* (2013.01); *C08K 3/36* (2013.01); *B60C 1/0016* (2013.01); *C08L 21/00* (2013.01); *Y02T 10/862* (2013.01)
USPC ........... 524/274; 524/270; 524/492; 524/493; 524/496; 524/525; 524/526

(58) Field of Classification Search
CPC .......... B60C 1/0016; C08K 3/04; C08K 3/36; C08L 9/00; C08L 45/02
USPC .......... 524/270, 492, 493, 496, 525, 526, 274
See application file for complete search history.

(56) References Cited

U.S. PATENT DOCUMENTS

| | | | |
|---|---|---|---|
| 4,987,194 A | 1/1991 | Maeda et al. | |
| 6,221,953 B1* | 4/2001 | Sandstrom et al. | 524/518 |
| 7,259,205 B1* | 8/2007 | Pagliarini et al. | 524/493 |
| 2006/0167165 A1 | 7/2006 | Hirayama et al. | |
| 2009/0326109 A1* | 12/2009 | Kameda et al. | 524/110 |
| 2011/0048599 A1 | 3/2011 | Ryba et al. | |

FOREIGN PATENT DOCUMENTS

| | | | |
|---|---|---|---|
| JP | 2-135256 A | 5/1990 | |
| JP | 9-103320 A | 4/1997 | |
| JP | 2006-124601 A | 5/2006 | |
| JP | 2006-199858 A | 8/2006 | |
| JP | 2006-249230 A | 9/2006 | |
| JP | 2007-186567 A | 7/2007 | |
| JP | 2007-262292 A | 10/2007 | |
| JP | 2008-189880 A | 8/2008 | |
| JP | 2009-096919 A | 5/2009 | |
| JP | 2009-138053 A | 6/2009 | |
| JP | 2009-270044 A | 11/2009 | |
| JP | 2010-031262 A | 2/2010 | |
| JP | 2011-246565 A | 1/2011 | |
| JP | 2011-057980 A | 3/2011 | |
| JP | 2011-144262 A | 7/2011 | |
| JP | 2011-144322 A | 7/2011 | |
| JP | 2011-144323 A | 7/2011 | |
| JP | 2011-144324 A | 7/2011 | |
| JP | 2011-148898 A | 8/2011 | |
| JP | 2011-246563 A | 12/2011 | |

OTHER PUBLICATIONS

English machine translation for JP-2006-249230-A dated Sep. 21, 2006.
English machine translation for JP-2007-186567-A dated Jul. 26, 2007.
English machine translation for JP-2007-262292-A dated Oct. 11, 2007.
English machine translation for JP-2008-189880-A dated Aug. 21, 2008.
English machine translation for JP-2009-138053-A dated Jun. 25, 2009.
English machine translation for JP-2009-270044-A dated Nov. 19, 2009.
English machine translation for JP-2009-96919-A dated May 7, 2009.
English machine translation for JP-2011-144262-A dated Jul. 28, 2011.
English machine translation for JP-2011-144322-A dated Jul. 28, 2011.

(Continued)

*Primary Examiner* — Vickey Nerangis
(74) *Attorney, Agent, or Firm* — Birch, Stewart, Kolasch & Birch, LLP

(57) ABSTRACT

The present invention provides a rubber composition for tires capable of improving handling stability, fuel economy, wet grip performance, elongation at break, and abrasion resistance together while maintaining the balance between them. The present invention also provides a pneumatic tire including the rubber composition. The present invention relates to a rubber composition for tires containing a diene rubber, silica having a BET specific surface area of 170 to 270 m$^2$/g, sulfur, and a liquid resin having a softening point of −20 to 45° C., wherein the amount of the liquid resin is 0.5 to 20 parts by mass, and the amount of the silica is 40 to 120 parts by mass, each per 100 parts by mass of the rubber component of the rubber composition.

9 Claims, No Drawings

(56) References Cited

OTHER PUBLICATIONS

English machine translation for JP-2011-144323-A dated Jul. 28, 2011.
English machine translation for JP-2011-144324-A dated Jul. 28, 2011.
English machine translation for JP-2011-148898-A dated Aug. 4, 2011.
English machine translation for JP-2011-246563-A dated Dec. 8, 2011.
English machine translation for JP-2011-246565-A dated Dec. 8, 2011.
English machine translation for JP-9-103320-A dated Apr. 22, 1997.
International Search Report issued in PCT/JP2012/060898, mailed on Aug. 21, 2012.

* cited by examiner

RUBBER COMPOSITION FOR TIRES AND PNEUMATIC TIRE

TECHNICAL FIELD

The present invention relates to a rubber composition for tires, and a pneumatic tire including the same.

BACKGROUND ART

In an effort to improve grip performance, fuel economy, and abrasion resistance, silica having a large BET specific surface area (fine particle silica) is added to rubber compositions for tires. Fine particle silica, however, has a strong tendency to agglomerate, and thus is difficult to uniformly disperse in rubber compositions. This poor dispersibility of fine particle silica in a rubber composition causes reduction in elongation at break of the rubber composition containing fine particle silica.

Though manufacturers of silica are trying to improve dispersibility of fine particle silica by controlling the surface activity and particle size distribution of fine particle silica, fine particle silica with a satisfactory dispersibility still remains to be developed. Moreover, in some cases, the use of a modified polymer whose end is modified for silica can end up preventing dispersion of silica because the polymer may bond to silica before silica is sufficiently dispersed.

Uniform dispersion of fine particle silica in rubber is thus desired to provide a compounded rubber excellent in elongation at break.

Meanwhile, rubber compositions for tires generally contain sulfur. However, sulfur dissolved in a polymer has an S8 structure, a melting point of 113° C., and a polarity (solubility parameter (SP): 10) close to that of carbon disulfide. Such sulfur is thus generally difficult to uniformly disperse in diene rubbers with low polarity (SP=8-9), such as natural rubber, butadiene rubber and styrene butadiene rubber, which are widely used for rubber compositions for tires.

To use less amount of S8 sulfur, techniques using a sulfur-containing hybrid cross-linking agent (1,6-bis(N,N'-dibenzylthiocarbamoyldithio)hexane), an alkylphenol-sulfur chloride condensate, or the like have been proposed. However, sulfur-containing hybrid cross-linking agents are generally expensive. Alkylphenol-sulfur chloride condensates are also poor in dispersibility, thus leading to deterioration in elongation at break or abrasion resistance.

Uniform dispersion of sulfur in rubber is thus desired to provide a compounded rubber excellent in elongation at break.

Meanwhile, tire components are required to have other properties, including handling stability and fuel economy. For example, the use of a tin-modified butadiene rubber, which strongly bonds to filler, has been proposed to improve fuel economy while maintaining handling stability.

Nonetheless, the effects of the above techniques are not sufficient to improve elongation at break. Further improved techniques are needed for providing handling stability, fuel economy, wet grip performance, elongation at break, and abrasion resistance together while maintaining the balance between them. Patent Literature 1, for example, discloses the use of a specific styrene butadiene rubber and a coumarone-indene resin to improve grip performance and the like, but does not discuss improving handling stability, fuel economy, or elongation at break.

CITATION LIST

Patent Literature

Patent Literature 1: JP 2006-124601 A

SUMMARY OF INVENTION

Technical Problem

The present invention aims to solve the above problems and provide a rubber composition for tires capable of improving handling stability, fuel economy, wet grip performance, elongation at break, and abrasion resistance together while maintaining the balance between them. The present invention also aims to provide a pneumatic tire including the rubber composition.

Solution to Problem

The present invention relates to a rubber composition for tires, containing: a diene rubber; silica having a BET specific surface area of 170 to 270 $m^2/g$; sulfur; and a liquid resin having a softening point of −20 to 45° C., wherein an amount of the liquid resin is 0.5 to 20 parts by mass, and an amount of the silica is 40 to 120 parts by mass, each per 100 parts by mass of a rubber component of the rubber composition.

The liquid resin is preferably at least one of a liquid coumarone-indene resin and a liquid terpene resin.

The rubber composition for tires preferably contains at least one resin selected from the group consisting of terpene resins having a softening point of 46 to 160° C., rosin resins having a softening point of 46 to 140° C., and aromatic petroleum resins having a softening point of 46 to 140° C.

Preferably, the aromatic petroleum resin is at least one of a coumarone-indene resin, an indene resin, and an aromatic vinyl polymer, and the aromatic vinyl polymer is a resin obtained by polymerizing at least one of α-methylstyrene and styrene.

The silica preferably has a BET specific surface area of 190 to 250 $m^2/g$.

The rubber composition for tires preferably contains zinc oxide in an amount of 0.5 to 2.9 parts by mass per 100 parts by mass of the rubber component.

The rubber composition is preferably for use as a rubber composition for treads.

The present invention also relates to a pneumatic tire, including the rubber composition.

Advantageous Effects of Invention

Since the rubber composition of the present invention contains a diene rubber, a predetermined amount of silica having a certain BET specific surface area, sulfur, and a predetermined amount of a liquid resin having a specific softening point, the use of the rubber composition in a tire component (especially, a tread) provides a pneumatic tire having excellent handling stability, fuel economy, wet grip performance, elongation at break, and abrasion resistance together while maintaining the balance between them.

DESCRIPTION OF EMBODIMENTS

The rubber composition for tires of the present invention contains a predetermined amount of a liquid resin having a softening point of −20 to 45° C. in addition to a diene rubber, a predetermined amount of silica (fine particle silica) having a BET specific surface area of 170 to 270 m²/g, and sulfur. This improves handling stability, fuel economy, wet grip performance, elongation at break, and abrasion resistance together while maintaining the balance between them. The reason for this improvement is not completely clear, but is presumably as follows.

Fine particle silica and sulfur are difficult to disperse uniformly in a rubber composition containing a diene rubber; however, the use of a liquid resin having a specific softening point in combination with fine particle silica and with sulfur enables the fine particle silica and sulfur to disperse uniformly throughout the rubber composition in a mixing step because the liquid resin itself has good dispersibility and it also exhibits a proper lubricating effect on the polymer chains of the diene rubber and thus provides a proper lubricity between the polymer chains of the diene rubber and the fine particle silica or sulfur. Further, the uniform dispersion of sulfur results in uniform cross-linking of polymers in a vulcanization step.

Thus, combination of a liquid resin having a specific softening point with a diene rubber, fine particle silica, and sulfur resolves the problem of poor dispersibility of fine particle silica and also allows uniform cross-linking of polymers leading to good elongation at bleak. Therefore, the handling stability, fuel economy, wet grip performance, elongation at break, and abrasion resistance can be improved together while maintaining the balance between them.

Especially when a liquid coumarone-indene resin having a specific softening point is used as the liquid resin, the resin and sulfur (in particular, the oxygen atoms in the liquid coumarone-indene resin and sulfur) are attracted to each other by Van der Waals' forces, and thus the surface of sulfur is coated with the resin, which reduces the surface energy of sulfur (or reduces agglomeration). Therefore, the difference in SP value between the sulfur surface and the diene rubber is reduced, which further promotes dispersion of sulfur. This effect as well as good dispersibility of the resin itself and the proper lubricating effect thereof on the polymer chains of a diene rubber enable sulfur to disperse more uniformly throughout the rubber composition in a mixing step and thus lead to more uniform cross-linking of polymers in a vulcanization step. Therefore, the effects of improving the properties described above are more suitably achieved.

The rubber component of the rubber composition of the present invention contains a diene rubber. Examples of diene rubbers include natural rubber (NR), epoxidized natural rubber (ENR), isoprene rubber (IR), butadiene rubber (BR), styrene butadiene rubber (SBR), styrene isoprene butadiene rubber (SIBR), chloroprene rubber (CR), and acrylonitrile butadiene rubber (NBR). The rubber component may further contain rubber materials other than diene rubbers (e.g., ethylene propylene diene rubber (EPDM), butyl rubber (IIR)). These rubber materials may be used alone or in combinations of two or more. Preferred among these are NR, BR and SBR because these allow handling stability, fuel economy, wet grip performance, elongation at break, and abrasion resistance to be provided together while maintaining the balance between them. Combination use of BR and SBR is more preferred, and combination use of NR, BR, and SBR is even more preferred. Combination of NR with BR and SBR allows handling stability, fuel economy, wet grip performance, elongation at break, and abrasion resistance to be more suitably provided together while maintaining the balance between them.

The BR is not particularly limited, and may be any one commonly used in the tire industry, such as, for example, high-cis BR (e.g., BR1220 produced by Zeon corporation, BR150B produced by Ube Industries, Ltd.), BR containing 1,2-syndiotactic polybutadiene (SPB) crystals (e.g., VCR412 and VCR617 produced by Ube Industries, Ltd.), butadiene rubber synthesized using a rare earth catalyst (rare earth-catalyzed BR), and the like. Preferred among these is rare earth-catalyzed BR because it provides fuel economy and elongation at break together while maintaining the balance between them.

The rare earth catalyst may be a conventional one, such as, for instance, a catalyst containing a lanthanoid rare earth element compound, an organic aluminum compound, an aluminoxane, or a halogen-containing compound, and optionally a Lewis base. Particularly preferred among such catalysts are neodymium (Nd) catalysts containing a Nd-containing compound as the lanthanide rare earth element compound.

Examples of lanthanoid rare earth element compounds include halides, carboxylates, alcoholates, thioalcoholates, and amides of rare earth metals having an atomic number of 57 to 71. Nd catalysts are preferred among these, as described above, because they provide BRs having a high cis content and a low vinyl content.

Examples of organic aluminum compounds include those represented by $AlR^aR^bR^c$ wherein $R^a$, $R^b$ and $R^c$ are the same as or different from each other, and each represent hydrogen or a C1 to C8 hydrocarbon group. Examples of aluminoxanes include acyclic aluminoxanes and cyclic aluminoxanes. Examples of halogen-containing compounds include metal halides such as aluminum halides represented by $AlX_kR^d_{3-k}$ wherein X represents a halogen; $R^d$ represents a $C_1$ to $C_{20}$ alkyl, aryl, or aralkyl group; and k represents 1, 1.5, 2 or 3; strontium halides such as $Me_3SrCl$, $Me_2SrCl_2$, $MeSrHCl_2$, or $MeSrCl_3$; silicone tetrachloride, tin tetrachloride, and titanium tetrachloride. The Lewis base, which may be used for complexation of a lanthanoid rare earth element compound, may suitably be acetyl acetone, a ketone, alcohol, or the like.

The rare earth catalyst may be dissolved in an organic solvent (e.g., n-hexane, cyclohexane, n-heptane, toluene, xylene, benzene), or be supported by an appropriate carrier such as silica, magnesia, or magnesium chloride, prior to use in the polymerization of butadiene. The polymerization may be carried out by either solution polymerization or bulk polymerization. The polymerization temperature is preferably −30 to 150° C., and the polymerization pressure may be appropriately selected depending on other conditions.

The rare earth-catalyzed BR preferably has a ratio (Mw/Mn) between the weight average molecular weight (Mw) and the number average molecular weight (Mn) of 1.2 or greater, more preferably 1.5 or greater. If the ratio Mw/Mn is smaller than 1.2, the BR tends to have significantly deteriorated processability. The Mw/Mn is preferably 5 or smaller, and more preferably 4 or smaller. If the ratio Mn/Mn is greater than 5, the effect of improving abrasion resistance tends to be reduced.

The rare earth-catalyzed BR preferably has a Mw of 300,000 or greater, more preferably 500,000 or greater, whereas it preferably has a Mw of 1,500,000 or smaller, more preferably 1,200,000 or smaller. The rare earth-catalyzed BR preferably has a Mn of 100,000 or greater, more preferably 150,000 or greater, whereas it preferably has a Mn of 1,000,000 or smaller, more preferably 800,000 or smaller. If the Mw or Mn is smaller than the lower limit of the range mentioned above, reduction in abrasion resistance and deterioration in fuel economy tend to occur. If the Mw or Mn is greater than the upper limit of the range, processability may be deteriorated.

The Mw and Mn herein are determined by gel permeation chromatography (GPC) relative to polystyrene standards.

The rare earth-catalyzed BR preferably has a cis content of 90% by mass or more, more preferably 93% by mass or more, and even more preferably 95% by mass or more. If the rare earth-catalyzed BR has a cis content of less than 90% by mass, its abrasion resistance may be reduced.

The rare earth-catalyzed BR preferably has a vinyl content of 1.8% by mass or less, more preferably 1.0% by mass or less, even more preferably 0.5% by mass or less, and particularly preferably 0.3% by mass or less. If the rare earth-catalyzed BR has a vinyl content of more than 1.8% by mass, its abrasion resistance may be reduced.

The vinyl content (the proportion of 1,2-butadiene unit) and the cis content (the proportion of cis-1,4-butadiene unit) in the rare earth-catalyzed BR can be measured by infrared absorption spectrometry.

The BR content based on 100% by mass of the rubber component is preferably 5% by mass or more, and more preferably 15% by mass or more. If the BR content is less than 5% by mass, abrasion resistance tends be reduced. The BR content is preferably 50% by mass or less, and more preferably 35% by mass or less. If the BR content is more than 50% by mass, processability tends to be significantly deteriorated.

The SBR is not particularly limited, and may be, for example, an emulsion-polymerized SBR (E-SBR), a solution-polymerized SBR (S-SBR), or a modified SBR prepared by modifying SBR using a primary amino group or the like. Preferred among these are modified SBRs because they are highly effective in improving handling stability, fuel economy, wet grip performance, elongation at break, and abrasion resistance.

Preferred examples of modified SBRs include ones coupled with tin, silicon, or the like. The modified SBR may be prepared by a coupling reaction according to a conventional method, for example, by reacting an alkali metal (e.g. Li) or an alkali earth metal (e.g. Mg) present in the chain end of the SBR with tin halide, silicon halide, or the like.

Preferred examples of modified SBRs also include styrene/butadiene copolymers containing a primary amino group or an alkoxysilyl group. The primary amino group may be bonded to any of a polymerization initiation end, a polymerization termination end, a polymer backbone, and a side chain of the polymer, and is preferably introduced into a polymerization initiation end or polymerization termination end of the polymer because the amino group can reduce energy loss at the chain ends of the polymer to improve the hysteresis loss properties.

In particular, the modified SBR may suitably be one prepared by modifying a polymerizing end (active end) of a solution-polymerized styrene butadiene rubber (S-SBR) with a compound represented by formula (I) below (modified S-SBR (modified SBR disclosed in JP 2010-111753 A)). In the case of such a modified SBR, it is easy to control the molecular weight of the polymer to reduce the amount of low molecular weight components which can increase tan δ. Such a modified SBR also increases the bonding strength between silica and polymer chains. Therefore, handling stability, fuel economy, wet grip performance, and elongation at break can be more improved.

[Chem. 1]

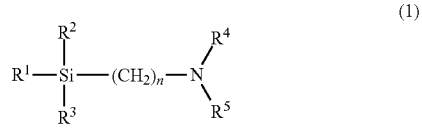

(1)

(In the formula, $R^1$, $R^2$, and $R^3$ are the same as or different from each other and each represent an alkyl group, an alkoxy group (preferably having 1 to 8 carbons, more preferably 1 to 6 carbons, and even more preferably 1 to 4 carbons), a silyloxy group, an acetal group, a carboxy group (—COOH), a mercapto group (—SH), or a derivative thereof; $R^4$ and $R^5$ are the same as or different from each other and each represent a hydrogen atom or an alkyl group (preferably having 1 to 4 carbons); and n represents an integer (preferably 1 to 5, more preferably 2 to 4, and even more preferably 3).)

Each of $R^1$, $R^2$, and $R^3$ is preferably an alkoxy group, and each of $R^4$ and $R^5$ is preferably an alkyl group. The compound with these groups provides excellent handling stability, fuel economy, wet grip performance, elongation at break, and abrasion resistance.

Specific examples of the compound represented by formula (I) include 3-aminopropyldimethylmethoxysilane, 3-aminopropylmethyldimethoxysilane, 2-dimethylaminoethyltrimethoxysilane, 3-diethylaminopropyltrimethoxysilane, and 3-dimethylaminopropyltrimethoxysilane. These compounds may be used alone or in combinations of two or more.

Styrene butadiene rubber may be modified with the compound (modifier) represented by formula (I) by any conventional method, such as those disclosed in JP H06-53768 B, JP H06-57767 B, JP 2003-514078 T and the like. For example, styrene butadiene rubber may be brought into contact with the modifier. Such methods include those in which styrene butadiene rubber is synthesized by anionic polymerization, and then a predetermined amount of the modifier is added to the solution of polymerized rubber to react the polymerizing end (active end) of the styrene butadiene rubber with the modifier; and those in which the modifier is added to a solution of styrene butadiene rubber to react them.

The SBR preferably has a bound styrene content of 35% by mass or less, more preferably 30% by mass or less. If the bound styrene content is more than 35% by mass, fuel economy may be deteriorated. The SBR also preferably has a bound styrene content of 15% by mass or more, more preferably 23% by mass or more. If the bound styrene content is less than 15% by mass, grip performance and reversion resistance tend to be poor.

The styrene content herein is measured by $^1$H-NMR.

The SBR content based on 100% by mass of the rubber component is preferably 50% by mass or more, and more preferably 65% by mass or more. If the SBR content is less than 50% by mass, wet grip performance and fuel economy may be deteriorated. The SBR content is preferably 90% by mass or less, and more preferably 85% by mass or less. If the SBR content is more than 90% by mass, the proportion of rubber materials used in combination with the SBR is reduced. In this case, the effects of improving handling stability, fuel economy, wet grip performance, elongation at break, and abrasion resistance may be insufficient.

The NR is not particularly limited, and may be any one commonly used in the tire industry, such as SIR20, RSS#3, and TSR20.

The NR content based on 100% by mass of the rubber component is preferably 5 to 25% by mass, and more preferably 5 to 15% by mass. A NR content within the range mentioned above allows handling stability, fuel economy, wet grip performance, elongation at break, and abrasion resistance to be more suitably provided together while maintaining the balance between them.

The rubber composition of the present invention contains sulfur. The sulfur may be in the form of powdered sulfur, precipitated sulfur, colloidal sulfur, insoluble sulfur, highly dispersible sulfur, or the like.

The rubber composition preferably contains sulfur in an amount of 0.5 parts by mass or more, more preferably 1.3 parts by mass or more, per 100 parts by mass of the rubber component. The amount is also preferably 2 parts by mass or less, and more preferably 1.7 parts by mass or less. When the sulfur is within the range mentioned above, excellent handling stability, fuel economy, wet grip performance, elongation at break, and abrasion resistance are obtained.

The rubber composition of the present invention contains silica (fine particle silica) having a BET specific surface area of 170 to 270 m$^2$/g.

The fine particle silica preferably has a BET specific surface area of 190 m$^2$/g or greater, more preferably 195 m$^2$/g or greater, and even more preferably 210 m$^2$/g or greater. If the silica has a BET specific surface area of smaller than 170 m$^2$/g, the silica fails to sufficiently improve handling stability, wet grip performance, elongation at break, and abrasion resistance. The silica preferably has a BET specific surface area of 250 m$^2$/g or smaller, more preferably 245 m$^2$/g or smaller. If the silica has a BET specific surface area of greater than 270 m$^2$/g, the silica is poor in dispersibility, failing to sufficiently improve handling stability, fuel economy, wet grip performance, elongation at break, and abrasion resistance.

The BET specific surface area of silica herein is measured in accordance with ASTM D3037-81.

The rubber composition contains the fine particle silica in an amount of 40 parts by mass or more, preferably 50 parts by mass or more, per 100 parts by mass of the rubber component. If the amount of the silica is less than 40 parts by mass, the effects of improving handling stability, fuel economy, wet grip performance, elongation at break, and abrasion resistance are insufficient. The amount of the fine particle silica is 120 parts by mass or less, preferably 110 parts by mass or less, more preferably 100 parts by mass or less, and even more preferably 85 parts by mass or less. If the amount of the silica is more than 120 parts by mass, the silica exhibits poor dispersibility, reducing handling stability, fuel economy, elongation at break, and abrasion resistance.

In the present invention, the rubber composition may contain other kinds of silica (large particle size silica) in combination with the fine particle silica. This combination further improves handling stability, fuel economy, and abrasion resistance. The silica other than the fine particle silica preferably has a BET specific surface area of 100 to 130 m$^2$/g.

In the case of the combination use, the total amount of silica per 100 parts by mass of the rubber component is preferably 50 parts by mass or more, and more preferably 55 parts by mass or more. The total amount of silica is also preferably 150 parts by mass or less, more preferably 120 parts by mass or less, and even more preferably 90 parts by mass or less. If the total amount of silica is less than the lower limit or more than the upper limit of the range mentioned above, the same trends are observed as mentioned for the amount of the fine particle silica.

The rubber composition of the present invention preferably contains a silane coupling agent in combination with silica. The silane coupling agent may be any silane coupling agent conventionally used in combination with silica in the rubber industry. Examples thereof include sulfide silane coupling agents such as bis(3-triethoxysilylpropyl)tetrasulfide, mercapto silane coupling agents such as 3-mercaptopropyltrimethoxysilane, vinyl silane coupling agents such as vinyltriethoxysilane, amino silane coupling agents such as 3-aminopropyltriethoxysilane, glycidoxy silane coupling agents such as γ-glycidoxypropyltriethoxysilane, nitro silane coupling agents such as 3-nitropropyltrimethoxysilane, and chloro silane coupling agents such as 3-chloropropyltrimethoxysilane. These silane coupling agents may be used alone or in combinations of two or more. Preferred among these are sulfide silane coupling agents, with bis(3-triethoxysilylpropyl)disulfide being more preferred.

The amount of silane coupling agent per 100 parts by mass of silica is preferably 3 parts by mass or more, more preferably 5 parts by mass or more, and even more preferably 8 parts by mass or more. If the amount of silane coupling agent is less than 3 parts by mass, abrasion resistance, elongation at break, and viscosity (processability) tend to be deteriorated. The amount of silane coupling agent is also preferably 20 parts by mass or less, and more preferably 15 parts by mass or less. If the amount of silane coupling agent is more than 20 parts by mass, its effect tends not to be commensurate with the increase in cost.

The rubber composition of the present invention contains a liquid resin having a softening point of −20 to 45° C. The liquid resin is preferably used in place of oil.

The liquid resin has a softening point of −20° C. or higher, preferably −10° C. or higher. If the liquid resin has a softening point of lower than −20° C., the effects of improving fuel economy, elongation at break, and handling stability are insufficient. The softening point is 45° C. or lower, preferably 40° C. or lower. If the softening point is higher than 45° C., fuel economy, elongation at break, and abrasion resistance are deteriorated.

The softening point of the liquid resin herein means a temperature at which a ball falls in measurement of the softening point using a ring and ball softening point measuring apparatus in accordance with JIS K 6220-1:2001.

The liquid resin is any resin having a softening point within the range mentioned above. Examples thereof include liquid aromatic petroleum resins (aromatic petroleum resins (in particular, liquid coumarone-indene resins) having a softening point within the above range (coumarone-indene resins having a softening point within the above range)), liquid terpene resins (terpene resins having a softening point within the above range), and liquid rosin resins (rosin resins having a softening point within the above range). Preferred among these are liquid aromatic petroleum resins (in particular, liquid coumarone-indene resins) and liquid terpene resins, and more preferred are liquid coumarone-indene resins, because these resins contribute to suitably achieving the effects of the present invention.

The aromatic petroleum resins are resins obtained by polymerizing a C8 to C10 aromatic fraction which is generally obtained by naphtha cracking and which includes, as a main monomer, vinyltoluene, indene, or methylindene. Other aromatic fractions include styrene analogues such as α-methylstyrene or β-methylstyrene and styrene. The aromatic petroleum resin may contain a coumarone unit. The aromatic petroleum resin may also contain an aliphatic olefin unit, a phenol unit, or a cresol unit.

Examples of the aromatic petroleum resins include coumarone-indene resins, indene resins, aromatic vinyl polymers (resins obtained by polymerizing α-methylstyrene and/or styrene), and C9 hydrocarbon resins. Preferred among these are coumarone-indene resins because these resins contribute to suitably achieving the effects of the present invention. That is, coumarone-indene resins having a softening point within the range mentioned above are preferred.

The coumarone-indene resin contains coumarone and indene as the monomer units forming the skeleton (backbone). The skeleton may contain monomer units other than coumarone and indene, such as styrene, α-methylstyrene, methylindene, or vinyltoluene.

Examples of the terpene resins include polyterpene resins and terpene phenol resins. Preferred are polyterpene resins. That is, preferred liquid terpene resins are liquid polyterpene resins (polyterpene resins having a softening point within the range mentioned above).

The polyterpene resin is a resin obtained by polymerizing a terpene compound, or a hydrogenated product of the resin. The terpene compound is a hydrocarbon represented by $(C_5H_8)$, or an oxygenous derivative thereof, whose basic structure is any of terpenes classified into monoterpenes $(C_{10}H_{16})$, sesquiterpenes $(C_{15}H_{24})$, diterpenes $(O_{20}H_{32})$, and the like. Examples of the compound include α-pinene, β-pinene, dipentene, limonene, myrcene, allo-ocimene, ocimene, α-phellandrene, α-terpinene, γ-terpinene, terpinolene, 1,8-cineole, 1,4-cineole, α-terpineol, β-terpineol, and γ-terpineol.

Examples of the polyterpene resins include terpene resins formed from the terpene compounds described above, such as α-pinene resin, β-pinene resin, limonene resin, dipentene resin, or β-pinene/limonene resin, as well as hydrogenated terpene resins prepared by hydrogenating any of the terpene resins. Preferred among these is limonene resin because it provides excellent grip performance.

Examples of the terpene phenol resins include resins formed from the terpene compound and a phenol compound. Specific examples thereof include resins prepared by condensation of the terpene compound, a phenol compound, and formalin. Examples of the phenol compound include phenol, bisphenol A, cresol, and xylenol.

The rosin resin may be any known rosin resin, and examples thereof include rosins such as material rosins (e.g., gum rosin, wood rosin, tall oil rosin), dismutation products obtained by dismutation of material rosins, stabilized rosins obtained by hydrogenating material rosins, and polymerized rosins; esterified rosins (rosin ester resins), phenol-modified rosins, unsaturated acid (e.g., maleic acid)-modified rosins, and formylated rosins obtained by reducing rosins.

The rubber composition contains the liquid resin in an amount of 0.5 parts by mass or more, preferably 1 part by mass or more, per 100 parts by mass of the rubber component. If the amount of the liquid resin is less than 0.5 parts by mass, the effects of improving handling stability, fuel economy, elongation at break, and abrasion resistance are insufficient. The amount of the liquid resin is 20 parts by mass or less, preferably 10 parts by mass or less, and even more preferably 6 parts by mass or less. If the amount of the liquid resin is more than 20 parts by mass, the rubber composition has poor hardness and thus provides deteriorated handling stability.

The rubber composition of the present invention preferably contains at least one resin selected from the group consisting of terpene resins having a softening point of 46 to 160° C., rosin resins having a softening point of 46 to 140° C., and aromatic petroleum resins having a softening point of 46 to 140° C. With such a resin(s), handling stability, fuel economy, wet grip performance, elongation at break, and abrasion resistance can be more suitably improved. This is presumably because such a resin in the form of spheres having a diameter of 100 nm to 1 μm is distributed in the rubber composition and then exhibits grip effects (e.g., a spike effect, an adhesive tape effect resulting from melting of the resin on heated road surfaces) in a physical manner.

Preferred resins selected from the above group are terpene resins and aromatic petroleum resins. Terpene resins are highly effective in improving wet grip performance and fuel economy, while aromatic petroleum resins are highly effective in improving wet grip performance.

The combined amount of the resins selected from the above group per 100 parts by mass of the rubber component is preferably 1 part by mass or more, and more preferably 2 parts by mass or more. The combined amount is preferably 20 parts by mass or less, more preferably 10 parts by mass or less, and even more preferably 6 parts by mass or less. When the combined amount is within the range mentioned above, handling stability, fuel economy, wet grip performance, elongation at break, and abrasion resistance can be more suitably improved.

The terpene resins having a softening point of 46 to 160° C. are only different in the softening point from the liquid terpene resins described above. Suitable examples of the terpene resins include polyterpene resins and terpene phenol resins. Preferred polyterpene resins include limonene resin because it provides excellent grip performance.

The terpene resin preferably has a softening point of 46° C. or higher, more preferably 80° C. or higher, and even more preferably 100° C. or higher. If the terpene resin has a softening point of lower than 46° C., the effect of improving grip performance may be reduced. The softening point is preferably 160° C. or lower, and more preferably 135° C. or lower. If the softening point is higher than 160° C., the resin may exhibit reduced dispersibility leading to reduction in elongation at break and abrasion resistance.

If only the terpene resin(s) is selected from the above group, the preferred amount of the terpene resin(s) is as mentioned for the combined amount of the resins selected from the group described above.

The rosin resins having a softening point of 46 to 140° C. are only different in the softening point from the liquid rosin resins. Preferred is gum rosin because it allows handling stability, fuel economy, wet grip performance, elongation at break, and abrasion resistance to be provided together while maintaining the balance between them.

The rosin resin preferably has a softening point of 46° C. or higher, more preferably 50° C. or higher, and even more preferably 55° C. or higher. If the softening point is lower than 46° C., the effect of improving grip performance may be reduced. The softening point is preferably 140° C. or lower, more preferably 100° C. or lower, and even more preferably 80° C. or lower. If the softening point is higher than 140° C., the resin may exhibit reduced dispersibility leading to reduction in elongation at break and abrasion resistance.

If only the rosin resin (s) is selected from the above group, the preferred amount of the rosin resin(s) is as mentioned for the combined amount of the resins selected from the group described above.

The aromatic petroleum resins having a softening point of 46 to 140° C. are resins having a softening point of 46 to 140° C., obtained by polymerizing a C8 to C10 aromatic fraction which is generally obtained by naphtha cracking and which includes, as a main monomer, vinyltoluene, indene, or methylindene. Other aromatic fractions include styrene analogues such as α-methylstyrene or β-methylstyrene and styrene. The aromatic petroleum resin may contain a coumarone unit. The aromatic petroleum resin may also contain an aliphatic olefin unit, a phenol unit, or a cresol unit.

The aromatic petroleum resin preferably has a softening point of 46° C. or higher, preferably 60° C. or higher, more preferably 70° C. or higher, even more preferably 80° C. or higher, and particularly preferably 90° C. or higher. If the softening point is lower than 46° C., the effect of improving grip performance may be reduced. Also, the softening point is 140° C. or lower, preferably 130° C. or lower. If the softening point is higher than 140° C., the resin may exhibit reduced dispersibility leading to reduction in elongation at break and abrasion resistance.

Examples of the aromatic petroleum resins include coumarone-indene resins, indene resins, aromatic vinyl polymers (resins obtained by polymerizing α-methylstyrene and/or styrene), and C9 hydrocarbon resins. Preferred among these are coumarone-indene resins, indene resins, and aromatic vinyl polymers because these allow handling stability, fuel economy, wet grip performance, elongation at break, and abrasion resistance to be provided together while maintaining the balance between them. More preferred are coumarone-indene resins and aromatic vinyl polymers. Combination use of a coumarone-indene resin and an aromatic vinyl polymer is also preferred.

The coumarone-indene resins, included in the aromatic petroleum resins, are only different in the softening point from the liquid coumarone-indene resins. If only the coumarone-indene resin(s) as the aromatic petroleum resin(s) is selected from the above group, the preferred amount of the coumarone-indene resin(s) is as mentioned for the combined amount of the resins selected from the group described above.

The aromatic vinyl polymers contain styrene and/or α-methylstyrene as aromatic vinyl monomers (units). The polymer may be a homopolymer of either one of the monomers, or may be a copolymer of the monomers. The aromatic vinyl polymer is preferably a homopolymer of α-methylstyrene or styrene or a copolymer of α-methylstyrene and styrene, and more preferably a copolymer of α-methylstyrene and styrene, because these are economical and easily processable and provide excellent wet grip performance.

The aromatic vinyl polymer may suitably be a commercially available one, such as, for instance, SYLVARES SA85, SA100, SA120, and SA140E produced by Arizona chemical and R2336 produced by Eastman chemical.

The aromatic vinyl polymer preferably has a softening point of 46° C. or higher, more preferably 60° C. or higher, and even more preferably 70° C. or higher. If the softening point is lower than 46° C., dry grip performance may be reduced. The softening point is preferably 140° C. or lower, and more preferably 100° C. or lower. If the softening point is higher than 140° C., fuel economy may be deteriorated.

The softening point of the terpene reins, rosin resins, aromatic petroleum resins, and aromatic vinyl polymers means a temperature at which a ball falls in measurement of the softening point using a ring and ball softening point measuring apparatus in accordance with JIS K 6220-1:2001.

If only the aromatic vinyl polymer (s) is used as resin (s) selected from the above group, the preferred amount of the aromatic vinyl polymer(s) is as mentioned for the combined amount of the resins selected from the group described above.

The rubber composition of the present invention preferably contains carbon black. This provides good reinforcement, resulting in excellent handling stability, elongation at break, and abrasion resistance.

The carbon black preferably has a nitrogen adsorption specific surface area ($N_2SA$) of 40 $m^2/g$ or greater, more preferably 90 $m^2/g$ or greater. If the $N_2SA$ is smaller than 40 $m^2/g$, elongation at break and abrasion resistance may be insufficient. The $N_2SA$ is preferably 200 $m^2/g$ or smaller, and more preferably 130 $m^2/g$ or smaller. If the $N_2SA$ is greater than 200 $m^2/g$, fuel economy may be insufficient.

The $N_2SA$ of carbon black can be measured in accordance with JIS K 6217-2:2001.

The amount of carbon black per 100 parts by mass of the rubber component is preferably 3 parts by mass or more. If the amount of carbon black is less than 3 parts by mass, reinforcement may be insufficient. The amount of carbon black is preferably 50 parts by mass or less, and more preferably 10 parts by mass or less. If the amount of carbon black is more than 50 parts by mass, fuel economy may be insufficient.

The amount of zinc oxide per 100 parts by mass of the rubber component is preferably 0.5 parts by mass or more, more preferably 1.2 parts by mass or more, and even more preferably 1.5 parts by mass or more. If the amount of zinc oxide is less than 0.5 parts by mass, handling stability, fuel economy, elongation at break, and viscosity (processability) during processing tend to be insufficient. The amount of zinc oxide is also preferably 2.9 parts by mass or less, and more preferably 2.7 parts by mass or less. If the amount of zinc oxide is more than 2.9 parts by mass, abrasion resistance tends to be insufficient.

The rubber composition of the present invention may optionally contain, in addition to the above components, additives typically used in the manufacture of rubber compositions, such as, for example, stearic acid, various antioxidants, wax, oil, vulcanizing agents, and vulcanization accelerators.

The combined amount of oil, the liquid resin, and the resin(s) selected from the above group is preferably 2 to 30 parts by mass, and more preferably 6 to 25 parts by mass, per 100 parts by mass of the rubber component because then the effects of the present invention are sufficiently provided.

The rubber composition of the present invention can be prepared by a commonly used method. Specifically, for example, the above components are mixed with a Banbury mixer, kneader, open roll mill, or the like, and then the kneaded mixture is vulcanized to provide a rubber composition. The rubber composition can be used for tire components, and especially suitably for treads.

The pneumatic tire of the present invention can be produced using the rubber composition by a commonly used method.

Specifically, the unvulcanized rubber composition containing the above components is extruded and processed into the shape of a tire component (e.g. tread), and then formed together with other tire components on a tire building machine to build an unvulcanized tire. This unvulcanized tire is heat-pressurized in a vulcanizer, whereby a tire can be produced.

EXAMPLES

The present invention is more specifically described with reference with, but not limited to, examples.

The chemicals used in examples and comparative examples are listed below.

BR: CB24 (BR synthesized using a Nd catalyst (Nd-catalyzed BR), cis content: 96% by mass, vinyl content: 0.7% by mass, $ML_{1+4}$ (100° C.): 45, Mw/Mn: 2.69, Mw: 500,000, Mn: 186,000) produced by LANXESS SBR: HPR355 (modified S-SBR, bound styrene content: 27% by mass, terminated with an alkoxysilane by coupling; modified S-SBR obtained by modifying the polymerizing end of SBR with a compound represented by the formula (I)) produced by JSR Corporation

NR: TSR20

Carbon black: SHOBLACK N220 ($N_2SA$: 111 $m^2/g$) produced by Cabot Japan K.K.

Silica 1: Zeosil 1085Gr (BET specific surface area: 90 $m^2/g$) produced by Rhodia Silica 2: Zeosil 1115Gr (BET specific surface area: 115 $m^2/g$) produced by Rhodia Silica 3: Zeosil 1165 MP (BET specific surface area: 165 $m^2/g$) produced by Rhodia Silica 4: Ultrasil VN3 (BET specific surface area: 175 m$^2$/g) produced by Evonik Degussa Silica 5: Zeosil Premium 200 MP (BET specific surface area: 215 m$^2$/g) produced by Rhodia Silica 6: U9000Gr (BET specific surface area: 235 m$^2$/g) produced by Evonik Degussa Silica 7: a test product (BET specific surface area: 260 m$^2$/g) produced by Tokuyama Corporation Silica 8: a test product (BET specific surface area: 280 m$^2$/g) produced by Tokuyama Corporation Coumarone-indene resin 1: NOVARES C10 (liquid coumarone-indene resin, softening point: 5 to 15° C.) produced by Rutgers Chemicals Coumarone-indene resin 2: NOVARES C30 (liquid coumarone-indene resin, softening point: 20 to 30° C.) produced by Rutgers Chemicals Coumarone-indene resin 3: NOVARES C80 (coumarone-indene resin, softening point: 75 to 85° C.) produced by Rutgers Chemicals Coumarone-indene resin 4: NOVARES C100 (coumarone-indene resin, softening point: 95 to 105° C.) produced by Rutgers Chemicals Coumarone-indene resin 5: NOVARES C120 (coumarone-indene resin, softening point: 115 to 125° C.) produced by Rutgers Chemicals C5 petroleum resin: MARUKAREZ resin T-100AS (C5 petroleum resin, softening point: 102° C.) produced by Maruzen Petrochemical Co., Ltd.

Aromatic vinyl polymer: SYLVARES SA85 (copolymer of α-methylstyrene and styrene, softening point: 85° C., Mw: 1000) produced by Arizona chemical Polyterpene resin 1: Sylvares TRA25 (liquid polyterpene resin, softening point: 25° C.) produced by Arizona chemical Polyterpene resin 2: Sylvares TR5147 (polyterpene resin (limonene resin), softening point: 115° C.) produced by Arizona chemical Terpene phenol resin: Sylvares TP115 (terpene phenol resin, softening point: 115° C., hydroxy value: 50 KOHmg/g) produced by Arizona chemical Gum rosin resin: Chinese gum rosin WW (gum rosin resin, softening point: 60° C.) produced by Arakawa Chemical Industries Ltd.

C9 petroleum resin: TT120 (C9 hydrocarbon resin, softening point: 120° C.) produced by Rutger chemical Gmbb TDAE: VIVATEC 500 produced by H&R Wax: Ozoace 355 produced by Nippon Seiro Co., Ltd.

Antioxidant: ANTIGENE 6C (N-(1,3-dimethylbutyl)-N'-phenyl-p-phenylenediamine) produced by Sumitomo Chemical Co. Ltd.

TMQ: NOCRAC 224 produced by Ouchi Shinko Chemical Industrial Co., Ltd.

Stearic acid: stearic acid "TSUBAKI" produced by NOF Corporation

Zinc oxide: Ginrei R produced by Toho Zinc Co., Ltd.

Silane coupling agent: Si75 (bis(3-triethoxysilylpropyl) disulfide) produced by Evonik Degussa 5% oil-containing powdered sulfur: HK-200-5 produced by Hosoi Chemical Industry Co., Ltd.

TBBS: NOCCELER NS (N-tert-butyl-2-benzothiazolyl-sulfenamide) produced by Ouchi Shinko Chemical Industrial Co., Ltd.

DPG: NOCCELER D (diphenylguanidine) produced by Ouchi Shinko Chemical Industrial Co., Ltd.

Examples and Comparative Examples

The chemicals in formulation amounts shown in Table 1 or 2, except the sulfur and vulcanization accelerators, were introduced in a 1.7-L Banbury mixer, and then mixed for 5 minutes after completion of the introduction of fillers. When the temperature of the kneaded mixture reached a maximum temperature of 150° C., the kneaded mixture was discharged. Then, the sulfur and vulcanization accelerators were added to the kneaded mixture in an open roll mill and they were mixed at 95° C. for 5 minutes to provide an unvulcanized rubber composition. The unvulcanized rubber composition was press-vulcanized at 170° C. for 12 minutes to provide a vulcanized rubber composition.

Also, a test tire (tire size: 245/40R18) was prepared by forming the unvulcanized rubber composition into a tread shape, assembling this component with other tire components on a tire building machine, and press-vulcanizing the assembly at 170° C. for 12 minutes.

The vulcanized rubber compositions and test tires prepared as above were evaluated for the following properties. Tables 1 and 2 show the test results.

(Viscoelasticity Test)

The vulcanized rubber composition was measured for complex modulus E* (MPa) and loss tangent tan δ using a viscoelastic spectrometer VES (Iwamoto Seisakusyo Co., Ltd.) at a temperature of 40° C., a frequency of 10 Hz, an initial strain of 10%, and a dynamic strain of 2%. A greater E* value indicates higher rigidity and better handling stability, and a smaller tan δ value indicates lower heat build-up and better fuel economy.

(Wet Grip Performance)

The test tire was mounted on each wheel of a front wheel drive car (engine size: 2000 cc) made in Japan. The car was driven ten laps of a test track with a wet asphalt surface condition. During the test, the stability in steering control was evaluated by the driver. The result is expressed as an index relative to that of Example 8 (=100). A higher index indicates better wet grip performance.

(Tensile Test)

A No. 3 dumbbell specimen prepared from the vulcanized rubber composition was subjected to a tensile test at room temperature in accordance with JIS K 6251 "Rubber, vulcanized or thermoplastic—Determination of tensile stress-strain properties". Thus, the elongation at break EB (%) was measured. A higher EB indicates better elongation at break.

(Abrasion Resistance)

The test tire was mounted on each wheel of a front wheel drive car (engine size: 2000 cc) made in Japan. The car was driven on a test track with a dry asphalt surface condition. After the test, the remaining tread depth of the tire was measured (tread depth of the fresh tire: 8.0 mm) and then abrasion resistance was evaluated based on the depth. A larger tread depth indicates better abrasion resistance. The tread depth value is expressed as an index relative to that of Example 8 (=100). A higher index indicates better abrasion resistance.

TABLE 1

| | | Ex. 1 | Ex. 2 | Ex. 3 | Ex. 4 | Com. Ex. 1 | Com. Ex. 2 | Com. Ex. 3 | Com. Ex. 4 | Ex. 5 | Ex. 6 | Ex. 7 | Com. Ex. 5 | Ex. 8 | Com. Ex. 6 | Com. Ex. 7 | Com. Ex. 8 | Com. Ex. 9 |
|---|---|---|---|---|---|---|---|---|---|---|---|---|---|---|---|---|---|---|
| Formulation (part(s) by mass) | BR | 25 | 25 | 25 | 25 | 25 | 25 | 25 | 25 | 25 | 25 | 25 | 25 | 25 | 25 | 25 | 25 | 25 |
| | SBR | 75 | 75 | 75 | 75 | 75 | 75 | 75 | 75 | 75 | 75 | 75 | 75 | 75 | 75 | 75 | 75 | 75 |
| | NR | — | — | — | — | — | — | — | — | — | — | — | — | — | — | — | — | — |
| | Carbon black | 5 | 5 | 5 | 5 | 5 | 5 | 5 | 5 | 5 | 5 | 5 | 5 | 5 | 5 | 5 | 5 | 5 |
| | Silica 1 (BET: 90 m²/g) | 70 | — | — | — | — | — | — | — | — | — | — | — | — | — | — | — | — |
| | Silica 2 (BET: 115 m²/g) | — | 65 | — | — | — | — | — | — | — | — | — | — | — | — | — | — | — |
| | Silica 3 (BET: 165 m²/g) | — | — | 65 | — | — | — | — | — | — | — | — | — | — | — | — | — | — |
| | Silica 4 (BET: 175 m²/g) | — | — | — | 65 | — | — | — | — | — | — | — | — | — | — | — | — | — |
| | Silica 5 (BET: 215 m²/g) | — | — | — | — | 65 | 65 | 65 | 65 | 65 | 65 | 65 | 65 | — | — | — | — | — |
| | Silica 6 (BET: 235 m²/g) | — | — | — | — | — | — | — | — | — | — | — | — | — | 58 | — | — | — |
| | Silica 7 (BET: 260 m²/g) | — | — | — | — | — | — | — | — | — | — | — | — | 62 | — | — | — | — |
| | Silica 8 (BET: 280 m²/g) | — | — | — | — | — | — | — | — | — | — | — | — | — | — | 70 | 78 | 85 |
| | Coumarone-indene resin 1 | 4 | 4 | 4 | 4 | 4 | — | — | — | 8 | 16 | 1 | 16 | 4 | 4 | 4 | 4 | 4 |
| | Coumarone-indene resin 2 | — | — | — | — | — | 4 | — | — | — | — | — | — | — | — | — | — | — |
| | Coumarone-indene resin 3 | — | — | — | — | — | — | 4 | — | — | — | — | — | — | — | — | — | — |
| | Coumarone-indene resin 4 | — | — | — | — | — | — | — | 4 | — | — | — | — | — | — | — | — | — |
| | Coumarone-indene resin 5 | — | — | — | — | — | — | — | — | — | — | — | — | — | — | — | — | — |
| | Aromatic vinyl polymer | 4 | 4 | 4 | 4 | 4 | 4 | 4 | 4 | 4 | 8 | 4 | 4 | 4 | 4 | 4 | 4 | 4 |
| | Polyterpene resin 1 | — | — | — | — | — | — | — | — | — | — | — | — | — | — | — | — | — |
| | Polyterpene resin 2 | — | — | — | — | — | — | — | — | — | — | — | — | — | — | — | — | — |
| | Terpen phenol resin | — | — | — | — | — | — | — | — | — | — | — | — | — | — | — | — | — |
| | Gum rosin resin | — | — | — | — | — | — | — | — | — | — | — | — | — | — | — | — | — |
| | C9 petroleum resin | — | — | — | — | — | — | — | — | — | — | — | — | — | — | — | — | — |
| | TDAE | 12 | 12 | 12 | 12 | 12 | 12 | 12 | 12 | 8 | — | 15 | 16 | 10 | 10 | 10 | 10 | 10 |
| | Wax | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | Antioxidant | 3 | 3 | 3 | 3 | 3 | 3 | 3 | 3 | 3 | 3 | 3 | 3 | 3 | 3 | 3 | 3 | 3 |
| | TMQ | 1 | 1 | 1 | 1 | 1 | 1 | 1 | 1 | 1 | 1 | 1 | 1 | 1 | 1 | 1 | 1 | 1 |
| | Stearic acid | 3 | 3 | 3 | 3 | 3 | 3 | 3 | 3 | 3 | 3 | 3 | 3 | 3 | 3 | 3 | 3 | 3 |
| | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
| | Silane coupling agent | 6.3 | 6.5 | 6.5 | 6.5 | 6.5 | 6.5 | 6.5 | 6.5 | 6.5 | 6.5 | 6.5 | 6.5 | 6.5 | 6.5 | 5.6 | 4.7 | 5.1 |
| | 5% oil-containing powdered sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| | TBBS | 2 | 2 | 2 | 2 | 2 | 2 | 2 | 2 | 2 | 2 | 2 | 2 | 2 | 2 | 2 | 2 | 2 |
| | DPG | 2 | 2 | 2 | 2 | 2 | 2 | 2 | 2 | 2 | 2 | 2 | 2 | 2 | 2 | 2 | 2 | 2 |
| Evaluation | E* (40° C., 2% amplitude) target 7.0-7.5 | 7.04 | 7.22 | 7.44 | 7.26 | 7.44 | 7.2 | 7.34 | 7.2 | 7.38 | 7.12 | 7.11 | 7.02 | 7.49 | 7.29 | 7.06 | 7.19 | 7.26 |
| | tan δ (40° C.) target < 0.24 | 0.219 | 0.226 | 0.231 | 0.231 | 0.259 | 0.279 | 0.289 | 0.267 | 0.211 | 0.206 | 0.239 | 0.258 | 0.239 | 0.265 | 0.229 | 0.234 | 0.232 |
| | Wet grip performance target ≥ 100 | 100 | 102 | 104 | 101 | 103 | 106 | 106 | 93 | 100 | 101 | 102 | 103 | 100 | 92 | 97 | 95 | 103 |
| | Elongation at break EB (%) target ≥ 485 | 515 | 535 | 545 | 535 | 505 | 495 | 485 | 465 | 555 | 565 | 495 | 465 | 485 | 420 | 495 | 480 | 445 |
| | Abrasion resistance target ≥ 100 | 105 | 115 | 110 | 113 | 99 | 97 | 95 | 97 | 119 | 117 | 102 | 99 | 100 | 85 | 99 | 95 | 77 |

TABLE 2

| Formulation (part(s) by mass) | | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Com. Ex. 10 | Ex. 21 |
|---|---|---|---|---|---|---|---|---|---|---|---|---|---|---|---|
| BR | | 25 | 25 | 25 | 25 | 25 | 25 | 25 | 25 | 25 | 25 | 25 | 25 | 25 | 25 |
| SBR | | 75 | 75 | 75 | 75 | 75 | 65 | 75 | 75 | 75 | 75 | 75 | 75 | 75 | 75 |
| NR | | — | — | — | — | — | 10 | — | — | — | — | — | — | — | — |
| Carbon black | | 5 | 5 | 5 | 5 | 5 | 5 | 5 | 5 | 5 | 5 | 5 | 5 | 5 | 5 |
| Silica 1 (BET: 90 m²/g) | | — | — | — | — | — | — | — | — | — | — | — | — | — | — |
| Silica 2 (BET: 115 m²/g) | | — | — | — | — | — | — | — | — | — | — | — | — | — | — |
| Silica 3 (BET: 165 m²/g) | | — | — | — | — | — | — | 33 | — | — | — | — | — | — | — |
| Silica 4 (BET: 175 m²/g) | | — | — | — | — | — | — | — | — | — | — | — | — | — | — |
| Silica 5 (BET: 215 m²/g) | | 65 | 65 | 65 | 65 | 65 | 65 | 40 | — | 65 | 65 | 65 | 65 | — | — |
| Silica 6 (BET: 235 m²/g) | | — | — | — | — | — | — | — | 110 | — | — | — | — | 125 | 70 |
| Silica 7 (BET: 260 m²/g) | | — | — | — | — | — | — | — | — | — | — | — | — | — | — |
| Silica 8 (BET: 280 m²/g) | | — | — | — | — | — | — | — | — | — | — | — | — | — | — |
| Coumarone-indene resin 1 | | 4 | 4 | 4 | 4 | 4 | 4 | 4 | 4 | 4 | 4 | 4 | 4 | 4 | 4 |
| Coumarone-indene resin 2 | | — | — | — | — | — | — | — | — | — | — | — | — | — | — |
| Coumarone-indene resin 3 | | — | — | 3 | — | 2 | — | — | — | — | — | — | — | — | — |
| Coumarone-indene resin 4 | | — | — | — | — | 2 | — | — | — | — | — | — | — | — | — |
| Coumarone-indene resin 5 | | — | — | — | — | — | — | — | — | — | — | — | — | — | — |
| C5 petroleum resin | | — | — | — | — | — | — | — | — | — | — | — | — | — | — |
| Aromatic vinyl polymer | | 4 | 4 | 1 | 12 | 8 | 4 | 4 | 4 | — | — | — | — | 4 | 4 |
| Polyterpene resin 1 | | — | — | — | — | — | — | — | — | 4 | — | — | — | — | — |
| Polyterpene resin 2 | | — | — | — | — | — | — | — | — | — | 4 | — | — | — | — |
| Terpen phenol resin | | — | — | — | — | — | — | — | — | — | — | 4 | — | — | — |
| Gum rosin resin | | — | — | — | — | — | — | — | — | — | — | — | 4 | — | — |
| C9 petroleum resin | | — | — | — | — | — | — | — | — | — | — | — | — | — | — |
| TDAE | | 12 | 12 | 12 | 4 | 4 | 12 | 12 | 32 | 12 | 12 | 12 | 12 | 50 | 12 |
| Wax | | 1.5 | 1.5 | 1.5 | 1.5 | 1.5 | 1.5 | 1.5 | 1.5 | 1.5 | 1.5 | 1.5 | 1.5 | 1.5 | 1.5 |
| Antioxidant | | 3 | 3 | 3 | 3 | 3 | 3 | 3 | 3 | 3 | 3 | 3 | 3 | 3 | 3 |
| TMQ | | 1 | 1 | 1 | 1 | 1 | 1 | 1 | 1 | 1 | 1 | 1 | 1 | 1 | 1 |
| Stearic acid | | 3 | 3 | 3 | 3 | 3 | 3 | 3 | 3 | 3 | 3 | 3 | 3 | 3 | 3 |
| Zinc oxide | | 1 | 2.9 | 2.5 | 2.5 | 2.5 | 2.5 | 2.5 | 2.5 | 2.5 | 2.5 | 2.5 | 2.5 | 2.5 | 2.5 |
| Silane coupling agent | | 6.5 | 6.5 | 6.5 | 6.5 | 6.5 | 6.5 | 6.5 | 8.8 | 6.5 | 6.5 | 6.5 | 6.5 | 10 | 6.3 |
| 5% oil-containing powdered sulfur | | 1.5 | 1.5 | 1.5 | 1.5 | 1.5 | 1.5 | 1.5 | 1.5 | 1.5 | 1.5 | 1.5 | 1.5 | 1.5 | 1.5 |
| TBBS | | 2 | 2 | 2 | 2 | 2 | 2 | 2 | 2 | 2 | 2 | 2 | 2 | 2 | 2 |
| DPG | | 2 | 2 | 2 | 2 | 2 | 2 | 2 | 2 | 2 | 2 | 2 | 2 | 2 | 2 |
| Evaluation | | | | | | | | | | | | | | | |
| E* (40° C., 2% amplitude) | target 7.0-7.5 | 7.2 | 7.22 | 7.18 | 7.44 | 7.38 | 7.26 | 7.31 | 7.49 | 7.33 | 7.29 | 7.45 | 7.29 | 7.45 | 7.02 |
| tan δ (40° C.) | target < 0.24 | 0.228 | 0.219 | 0.221 | 0.238 | 0.231 | 0.211 | 0.214 | 0.288 | 0.223 | 0.221 | 0.238 | 0.229 | 0.315 | 0.223 |
| Wer grip performance | target ≥ 100 | 103 | 100 | 101 | 115 | 115 | 115 | 101 | 135 | 105 | 107 | 100 | 102 | 140 | 100 |
| Elongation at break EB (%) | target ≥ 485 | 555 | 525 | 535 | 525 | 540 | 555 | 520 | 495 | 525 | 535 | 565 | 545 | 450 | 505 |
| Abrasion resistance | target ≥ 100 | 121 | 111 | 117 | 105 | 110 | 118 | 120 | 110 | 111 | 108 | 105 | 102 | 102 | 100 |

In the examples using a diene rubber, a predetermined amount of silica having a certain BET specific surface area, sulfur, and a predetermined amount of a liquid resin having a specific softening point, handling stability, fuel economy, wet grip performance, elongation at break, and abrasion resistance were provided together while maintaining the balance between them.

The invention claimed is:

1. A pneumatic tire, comprising a tread comprising a rubber composition for tires, the rubber composition comprising:
   a diene rubber;
   silica having a BET specific surface area of 170 to 270 m$^2$/g;
   sulfur;
   a liquid coumarone-indene resin having a softening point of −20 to 45° C.;
   an aromatic vinyl polymer having a softening point of 46 to 140° C. obtained by polymerizing at least one of α-methylstyrene and styrene; and, optionally,
   oil,
   wherein
   an amount of the liquid resin is 0.5 to 20 parts by mass, and an amount of the silica is 40 to 120 parts by mass, each per 100 parts by mass of a rubber component of the rubber composition, and
   a combined amount of the oil, the liquid resin, and the aromatic vinyl polymer is 6 to 30 parts by mass per 100 parts by mass of a rubber component of the rubber composition.

2. The pneumatic tire according to claim 1,
   wherein the silica has a BET specific surface area of 190 to 250 m$^2$/g.

3. The pneumatic tire according to claim 1,
   wherein the rubber composition comprises zinc oxide in an amount of 0.5 to 2.9 parts by mass per 100 parts by mass of the rubber component.

4. The pneumatic tire according to claim 1,
   wherein the silica has a BET specific surface area of 210 to 250 m$^2$/g.

5. The pneumatic tire according to claim 1,
   wherein the rubber composition comprises carbon black having a nitrogen adsorption specific surface area of 90 to 130 m$^2$/g.

6. The pneumatic tire according to claim 1,
   wherein the diene rubber comprises butadiene rubber and styrene butadiene rubber.

7. The pneumatic tire according to claim 1,
   wherein the diene rubber comprises natural rubber, butadiene rubber, and styrene butadiene rubber.

8. The pneumatic tire according to claim 6,
   wherein the butadiene rubber comprises butadiene rubber synthesized using a rare earth catalyst.

9. The pneumatic tire according to claim 6,
   wherein the styrene butadiene rubber comprises a modified styrene butadiene rubber.

* * * * *